United States Patent [19]

Cocchetto et al.

[11] Patent Number: 5,219,509
[45] Date of Patent: Jun. 15, 1993

[54] METHOD FOR FORMING A UNIFORM SKIN ON A CELLULAR SUBSTRATE

[75] Inventors: Joseph F. Cocchetto, Painted Post; Harry A. Kragle, Corning; Floyd E. Stumpff, Elmira, all of N.Y.

[73] Assignee: Corning Incorporated, Corning, N.Y.

[21] Appl. No.: 620,099

[22] Filed: Nov. 30, 1990

[51] Int. Cl.⁵ .............................................. B29C 47/06
[52] U.S. Cl. ................................. 264/177.12; 264/173; 264/177.14
[58] Field of Search ....................... 264/177.12, 177.14, 264/173, 45.5

[56] References Cited

U.S. PATENT DOCUMENTS

| | | | |
|---|---|---|---|
| 3,790,654 | 2/1974 | Bagley | 264/177 |
| 4,163,640 | 8/1979 | Higuchi et al. | 264/177.12 |
| 4,168,944 | 9/1979 | Morikawa et al. | 264/209 |
| 4,298,328 | 11/1981 | Frost | 264/209 |
| 4,349,329 | 9/1982 | Naito et al. | 425/461 |
| 4,368,025 | 1/1983 | Naito et al. | 425/462 |
| 4,381,912 | 5/1983 | Yamamoto et al. | 425/461 |
| 4,486,934 | 12/1984 | Reed | 264/177.12 |
| 4,668,176 | 5/1987 | Zeibig et al. | 425/464 |
| 4,710,123 | 12/1987 | Zeibig et al. | 425/464 |
| 4,814,187 | 3/1989 | Inoue et al. | 425/464 |

FOREIGN PATENT DOCUMENTS

61-5915 1/1986 Japan .................................. 47/92

Primary Examiner—Allan R. Kuhns
Attorney, Agent, or Firm—Burton R. Turner

[57] ABSTRACT

A method and apparatus for forming a skin on an extruded honeycomb structure, wherein detrimental distortion of the peripheral cells is eliminated to thus provide a virtually distortion free honeycomb structure with an integral skin. Batch material is supplied for forming the central cellular structure, and a metered flow of skin-forming batch material is transitioned from a predominantly transverse flow to a predominantly longitudinal flow so as to minimize the distortion of web portions of the peripheral cells. In addition, the skin-forming batch material is subjected to a first or primary flow path reduction in the form of flow depth and then, as it is knitting with peripheral web portions of the central cellular structure, it is subjected to a second or secondary flow path reduction in the form of reduced cross-sectional area, so as to effect a complete knitting thereof while still within the extrusion die. A unitary cellular structure with an integral skin is then discharged from the die with improved structural and strength characteristics.

19 Claims, 7 Drawing Sheets (PRIOR ART)
Fig. 1

METHOD FOR FORMING A UNIFORM SKIN ON A CELLULAR SUBSTRATE

BACKGROUND OF THE INVENTION

This invention relates to the art of producing thin-walled honeycomb structures from extrudable material such as particulate ceramic and/or metal batches and similar materials which have the property of being able to flow or plastically deform during extrusion, while being able to become sufficiently rigid immediately thereafter so as to maintain their structural integrity. More particularly, the present invention relates to an improved extrusion die and mask assembly for forming a honeycomb structure with a smooth or contoured integral outer peripheral skin, wherein the usual distortion of the peripheral cells of the extruded honeycomb structure is virtually eliminated.

The prior art is replete with extrusion die and mask assemblies of different configurations for providing cellular structures with an outer skin; however, virtually all of such assemblies produce some distortion within the outer peripheral cells of the extruded honeycomb structure, and do not contemplate the unique concerns of the extrusion die apparatus of the present invention.

U.S. Pat. No. 3,790,654 relates to method and apparatus for forming honeycomb structures with an integral casing. An adjustable insert, having a tapered surface, is provided for varying the resistance to flow of the batch material supplied to an annular orifice for forming the integral casing about the honeycomb structure.

U.S. Pat. No. 4,168,944 relates to a complex apparatus for manufacturing a tubular honeycomb assembly with an adiabatic layer formed integrally on the peripheral wall thereof. Like the previously mentioned '654 patent, the casings or pipe sections of the '944 patent are extruded from an annular orifice.

U.S. Pat. No. 4,298,328 relates to an extrusion apparatus for preventing the distortion of peripheral cells in an extruded honeycomb structure. The die body and the mask are provided with parallel walls converging in the extrusion direction to form a peripheral gap therebetween, which gap may be varied to produce honeycomb structures with differing skin thicknesses.

U.S. Pat. No. 4,368,025 relates to an extrusion device for producing honeycomb structures wherein the skin is formed outwardly of the pin face of the die, by grooves formed in an overlying die mask, or by an annulus formed in the pins themselves, with openings formed in the mask face.

U.S. Pat. No. 4,381,912 discloses an extrusion die for forming a honeycomb structure wherein skin material flows laterally through the peripheral discharge slots alone, or through such slots and a gap, to knit with center webs and form a peripheral skin thereon.

U.S. Pat. No. 4,349,329 relates to an extrusion device for producing honeycomb structures wherein a pooling zone supplies material to form an outer wall and thickened web portions between outer peripheral cells.

U.S. Pat. No. 4,668,176 relates to an extrusion device for the production of honeycomb structures wherein a spring element controls the thickness of a passageway for the flow of skin material, and accordingly the thickness of the resulting skin, and a pivotal plate controls the flow of such skin material to such passageway.

U.S. Pat. No. 4,710,123 sets forth an extrusion device for the production of honeycomb structures wherein the skin flow rate is adjusted by the pneumatic movement of a ring, and the thickness of the skin is determined by a bolt-adjusted sleeve member.

U.S. Pat. No. 4,814,187 relates to an extruding die apparatus for forming honeycomb structural bodies wherein the rate of flow of the extrusion material is controlled by the use of flow impedance plates to provide an even flow across the die face.

Japanese Unexamined Patent Application Publication 61-5915 relates to an extrusion die for forming honeycomb shape material, wherein the rate of extrusion of the material adjacent the skin is controlled by the use of shorter rate-adjustment pins so as to match the rate of extrusion at the center of the die.

In order to overcome the problems and complexities with the above-noted die assemblies of the prior art, it is an object of the present invention to provide an extrusion die assembly for forming thin-walled cellular substrates with a smooth or uniformly contoured skin, such that the webs of the outer peripheral cells of the substrate are not detrimentally deformed or distorted during the skin formation, as was prevalent in the past.

Operationally, improved dry compressive strength of the skin-covered extruded cellular substrate is obtained by reason of the fact that the webs forming the peripheral cells of the substrate are virtually distortion free, due to the fact that detrimental lateral or transverse flow of the skin-forming material, which causes distortion, is virtually eliminated.

SUMMARY OF THE INVENTION

In its simplest form, the present invention sets forth a new concept in extrusion die and mask assemblies for forming honeycomb structures with an integral skin formed thereon, while eliminating detrimental distortion of the webs forming peripheral cells of the honeycomb structure, and thus providing improved compressive and crushing strengths in the structure.

Since any lateral flow of the skin-forming material into the longitudinal flow of the cellular substrate forming material, will have a tendency to crush the peripheral cells of the cellular substrate, the present invention provides a means for collecting the skin-forming material in a lateral flow and then transposing such flow so that a major component of the flow direction is longitudinal, so as to be parallel with that of the substrate material, while only a minor transverse component of such flow contacts the cellular substrate, thus facilitating improved knitting between the substrate and the skin.

Initially, the skin-forming material is collected within a collector passageway of predetermined size formed between a skin forming mask and a relieved peripheral portion of the outlet face of the die. The collector passageway, which may have a cross-section in the form of an annulus, communicates by means of a transition zone, which may be in the form of a smoothly curved radius, an arc or inclined angular surface portions, into a sloped skin-forming passage, which preferably is in the form of a frusto-conical configuration converging toward the outlet face of the die. In view of the fact that the opposed surfaces of the skin forming mask and the peripheral portion of the outer die surface, which form the collector passageway, the transition zone, and the sloped skin-forming passage, would be congruent with each other if the passages did not exist therebetween, a definite correlation exists between a variation in the thickness of the collector passageway and the thickness of the sloped skin-forming passage. In addition, the opposed surfaces of the skin forming mask and the die, provide parallel plate-like surfaces for confining the flow of the skin-forming material from the collection area to its discharge from the die assembly.

Extrusion material, including that which is utilized to form the skin, is fed, under a predetermined pressure, to a plurality of feed holes open to the back or inlet face of the die assembly. A central portion of the extrusion material is fed by the feed holes, parallel to the longitudinal axis of the die, to a plurality of interconnected discharge slots to form the webs of a honeycomb structure. A controlled flow of such extrusion material is forced through peripheral feed holes, which communicate with the collector passageway. The collector passageway has a larger flow gap or depth between the mask and the die, taken in a plane containing the longitudinal axis of the die and in a direction perpendicular to the direction of flow therein, than the flow gap or depth of the sloped skin-forming passage between the mask and the die, again taken in a plane containing the longitudinal axis of the die and in a direction perpendicular to the direction of flow therein, thus producing a first or primary reduction in the flow paths. A second or secondary reduction occurs in the skin-forming passage. That is, since the frusto-conical flow passage decreases in diameter toward the outlet face of the die, it results in the fact that the cross-sectional area of the frusto-conical passage, taken in a plane perpendicular to the longitudinal axis, decreases as the flow path proceeds toward the outlet face and thus maintains the skin material under pressure between the two parallel plate-like surfaces, and the skin and peripheral webs are knit together within the die.

While the method and die of this invention can be used to make honeycomb or cellular structures with a variety of dimensions, they are especially useful in making such products with web thicknesses of less than about 6 mils (0.15 mm) and also with more than 75% transverse open frontal area.

BRIEF DESCRIPTION OF THE DRAWINGS

FIG. 8 illustrates the skin forming mask and the die body in congruent relationship without any shim placed therebetween.

FIG. 9 illustrates the skin forming mask and the die body with a shim positioned therebetween.

FIG. 10 illustrates the positionment of the skin forming mask and the die body with a larger shim positioned therebetween.

DESCRIPTION OF THE PREFERRED EMBODIMENTS

In the traditional prior art methods of forming skin on a cellular substrate, the flow of batch material forming the skin included a substantial transverse component, which impacted upon the longitudinal flow of batch material forming the cellular substrate, such as shown in U.S. Pat. Nos. 4,386,025 and 4,381,912. Thus, the radially-inward momentum or transverse component of the flow of batch forming the skin, had to be resistant by the newly formed wet cellular substrate. However, only in the area where the webs of the cells met the skin was it possible to provide any resistance to such transverse momentum. Accordingly, the webs forming the peripheral cells were distorted and deformed by such lateral or transverse flow component of the skin-forming batch, thus resulting in deformed or crushed peripheral cells.

Figure 1:
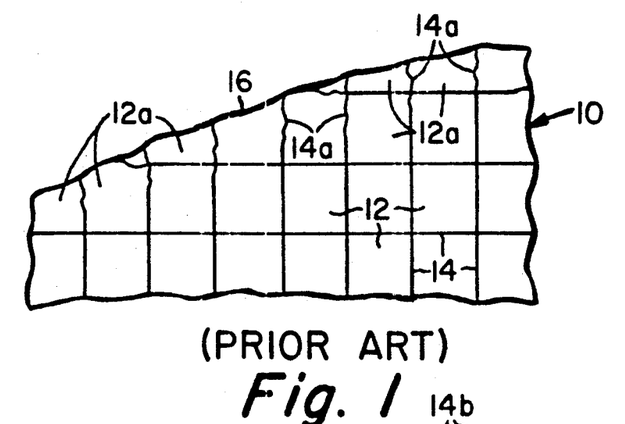
FIG. 1 is a schematic fragmental view of a honeycomb structure having a skin formed thereon in accordance with the method and apparatus of the prior art, showing the distortion of the webs adjacent the outer peripheral cells.

As shown in FIG. 1, a cellular substrate 10 having a plurality of cells 12 formed by webs 14 is provided with a skin 16. However, a slight collapse or distortion of the web portions 14a adjacent the periphery of the substrate occurs due to the transverse component of the batch flow forming the skin 16, thus resulting in crushed peripheral cells 12a. Where such distortion exists, the webs lose their columnar strength integrity and compressive strength, and accordingly the substrate can fail during isostatic testing, or when assembled under compressive loads on the skin. With the present invention, the detrimental transverse flow of skin-forming material is virtually eliminated, such that the major component of such skin-forming flow is longitudinal to complement the longitudinal flow of the web forming batch material.

Figure 2:
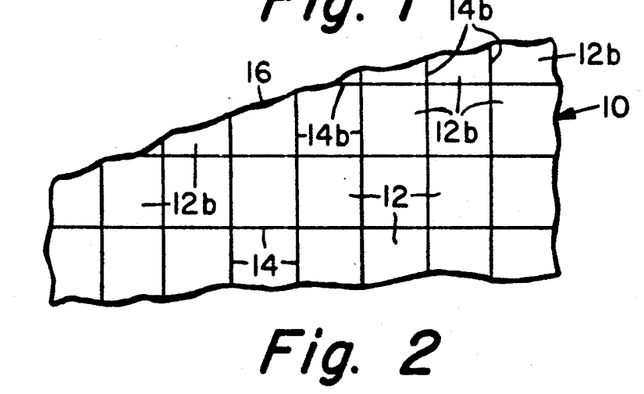
FIG. 2 is a schematic fragmental view of a cellular substrate having a skin formed thereon in accordance with the present invention.

The direction of the flow of the skin-forming material is controlled so that only a minor transverse component is present as the flow angularly contacts the substrate during the skin forming process, and knitting of the skin and the webs of the cellular substrate is accomplished with the major component of the flow being longitudinal with the web forming material. Thus, as shown in FIG. 2, the cellular substrate 10 of the present invention, having cells 12 formed by webs 14 and provided with integral skin 16, has uniform and straight peripheral web portions 14b, which are not distorted by the skin-forming material. Thus, the peripheral cells 12b are not crushed by the formation of the skin 16 on the substrate, although the skin may exhibit a slight waviness where not supported by the peripheral webs 14b. Accordingly, the substrate of the present invention has improved compressive and crushing strengths over the prior art substrates.

Figure 3:
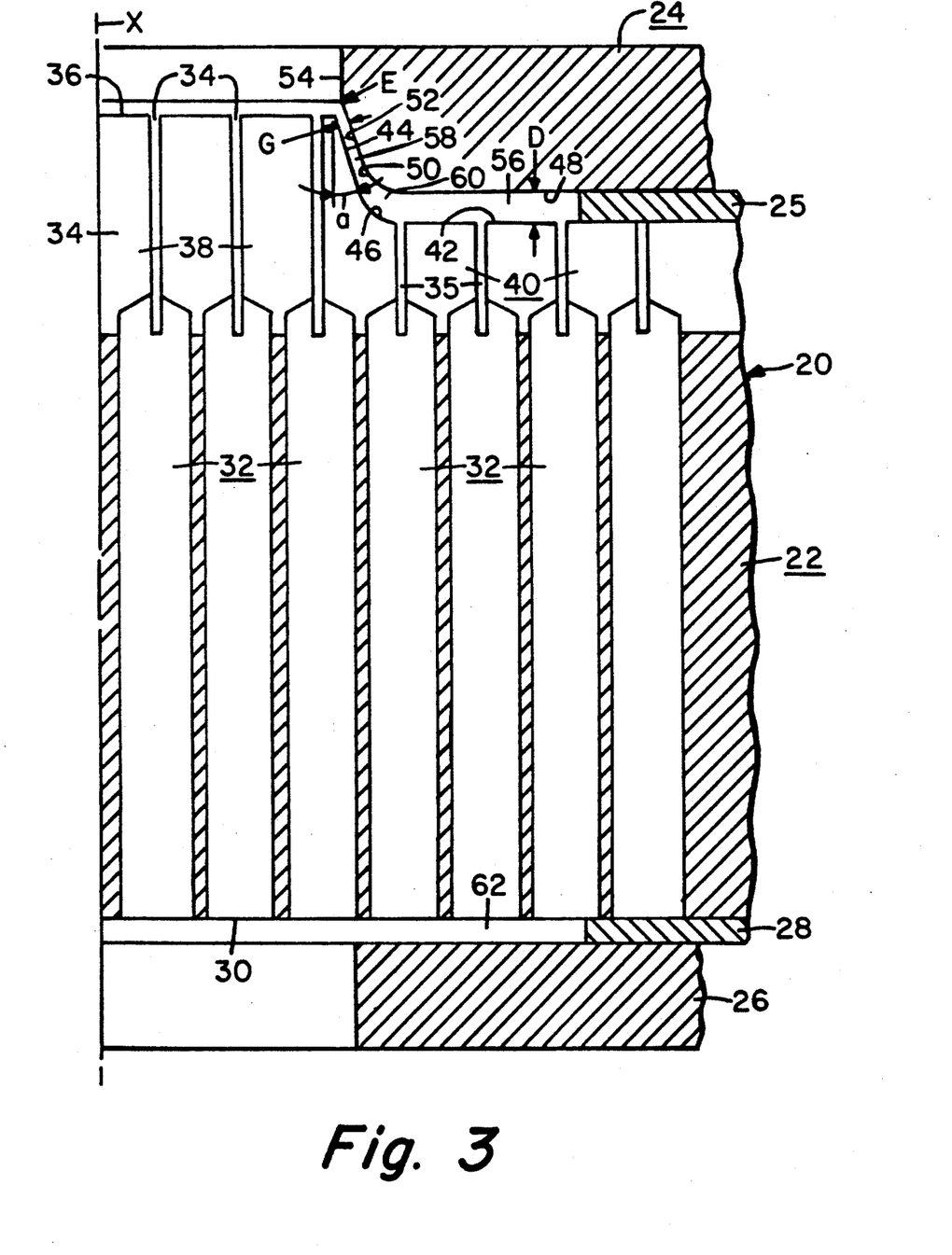
FIG. 3 is a fragmental cross-sectional view in elevation of a preferred extrusion die assembly of the present invention.
Figure 4:
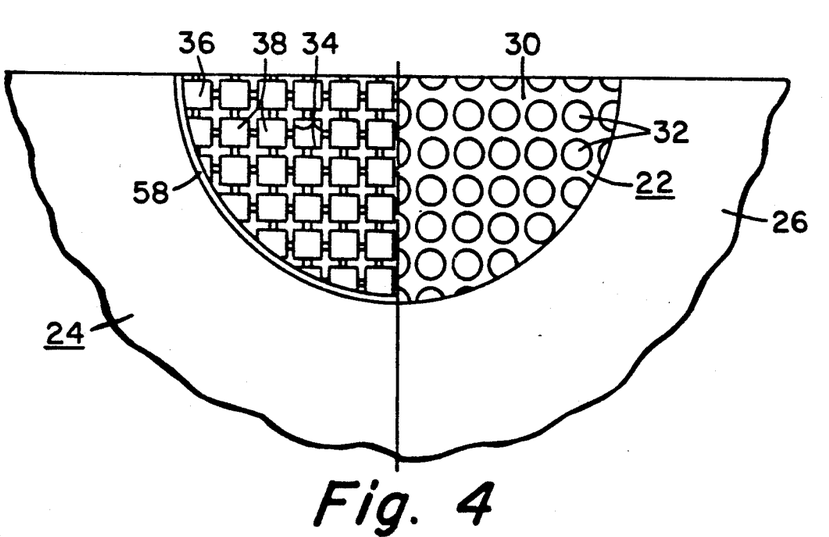
FIG. 4 is a fragmental plan view which shows a front section and a rear section view of FIG. 3.

Referring now to FIGS. 3 and 4, a preferred embodiment of the extrusion die assembly of the present invention is shown at 20 including the die body 22, a skin forming mask 24, a shim 25 for positioning the mask 24 with a desired spacing from the die body 22, a flow control plate 26 and a spacer 28 for positioning the flow control plate from the inlet end 30 of the die body 22. The die body 22 is provided with a plurality of individual feed holes 32 communicating at one end with the inlet end 30 of the die body and at an opposite end with a plurality of interconnected discharge slots 34, 35. The discharge slots 34 communicate with a central outlet face 36 of the die body and surround and actually form a plurality of pins 38, which form the cells 12 in the cellular substrate 10. The thickness of the webs or walls of the cellular honeycomb structure extruded from the die is generally about equal to the width of the discharge slots.

A peripheral portion of the outlet face 36 is relieved so as to form a plurality of peripheral partial pins 40 having an outlet face 42 which is parallel to and offset from central outlet face 36. A sloped or frusto-conical surface 44, which is shown as being provided with a smooth radius 46 adjacent outlet face 42, connects the stepped or offset outlet face 42 with the central outlet face 36.

Skin forming mask 24 occupies the peripheral relieved portion of outlet face 36, but is spaced therefrom a given distance by the desired thickness of shim 25. As shown, the mask 24 has an inner surface 48 which complements offset outlet face 42, a smooth radius 50 which complements the radius 46, a sloped or frusto-conical surface 52 which complements sloped surface 44, and a straight cylindrical surface 54 which is perpendicular to the plane of outlet face 36.

The shim 25 positions the inner surface 48 of mask 24 a given distance from the offset outlet face 42 to form a collector passageway 56 having a cross-section, in a plane perpendicular to the longitudinal axis, in the form of an annulus. The sloped surface 52 of the mask and sloped surface 44 of the die body form a sloped skin-forming passage 58 in the form of a frusto-conical configuration converging toward the outlet face 36 of the die body 22. The passageway 56 and the passage 58 are confined by the opposing parallel surfaces 42, 48 and 44, 52, respectively, and such passages are joined together by a transition zone, such as radiused gap 60 formed between the smooth radiuses 46, 50. Although the main purpose of the shim 25 is to function as a gap adjustment, to control skin thickness by adjusting the skin gap G between surfaces 44 and 52 of the skin forming passage 58, a minor effect on flow impedance is produced by varying the thickness of the shim. However, the main skin flow control apparatus is the combination of the flow control plate 26 and the spacer 28 positioned adjacent the inlet end 30 of the die body, as set forth hereinafter.

The angle a between the sloped surface 44 and the longitudinal axis X of the die 22 (which is also the flow axis of the batch material), is the same as the angle which sloped surface 52 makes with such longitudinal axis, and accordingly, such surfaces are parallel to one another. Angle a, which represents the slope angle of skin-forming passage 58, should represent an ultimate compromise which addresses pin strength, adjustability of the skin gap dimension, and the angle at which the skin leaves the die. A preferred angle a for a 400-cell die with 0.053" slot centers and 0.105" deep slots, is 18° from the longitudinal flow axis X, although acceptable results are obtainable with angles within ±15° of the preferred angle. By utilizing an angle of approximately 18°, the sloping sidewall of the pins forming passage 58 each culminates in a pyramid-like base which resists toppling and provides substantial bottom support, even for peripheral pins which appear as mere slivers at the die face. Further, an 18° slope angle turns the skin-forming batch material almost in a direction parallel to the longitudinal direction of extrusion of the web-forming batch material, so that the major flow component of the skin-forming batch material is parallel to the longitudinal web-extrusion flow.

Such flow of the skin-forming batch material not only improves the mask fill of the skin, but also virtually eliminates detrimental distortion of the webs forming the peripheral cells. Also, by using sloped sidewalls in the skin-forming passage, it is possible to adjust the skin forming gap in such passage by varying the thickness of the shim, which is not possible when utilizing a passage bounded by straight pin walls perpendicular to the outlet face. There is an approximate 3 to 1 ratio between the shim thickness and the skin gap dimension, such that each 0.003" (0.076 mm) added to the shim thickness results in an increase of about 0.001" (0.025 mm) to the skin forming gap.

The following formula is useful in determining the preferred angle for various die configurations:

$$\text{Angle } a = \text{Arctan} \left[ \frac{\text{pin width} \times 0.707}{(\text{slot depth} - \text{overlap})} \right]$$

wherein the pin width is the width of a pin 38, the slot depth is the longitudinal length of a slot 34, and the overlap is the distance which a slot 34 extends, in the longitudinal flow direction, into a feed hole 32 at its intersection therewith.

Figure 8:
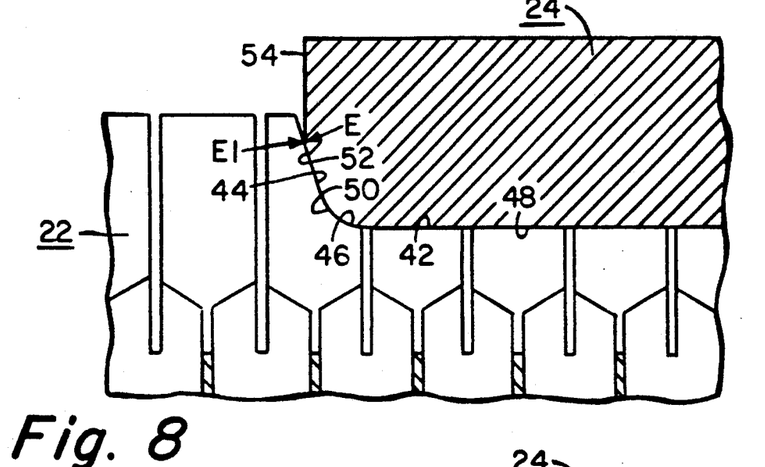
FIGS. 8-10 are fragmental cross-sectional views in elevation illustrating the relationship between the skin forming mask and the outlet face of the die.
Figure 9:
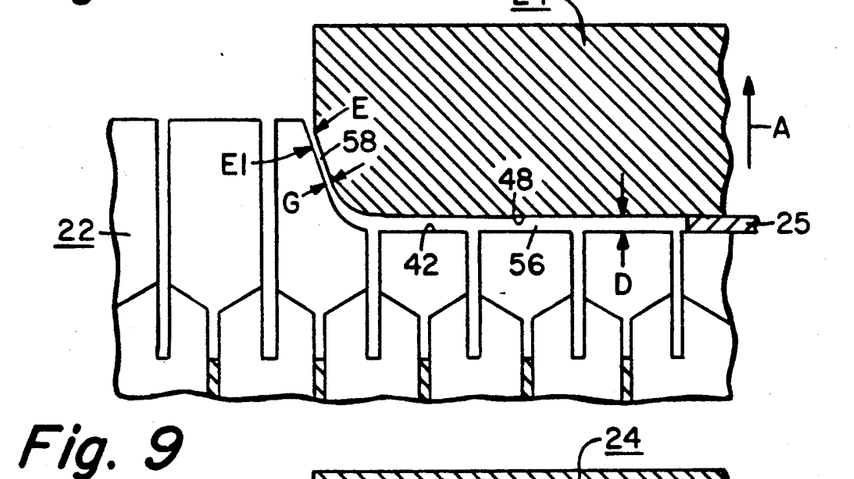
Figure 10:
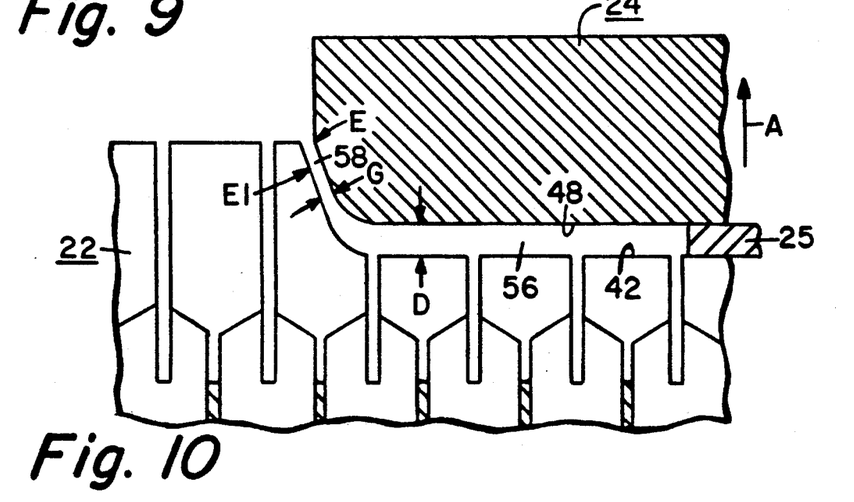

In order to better understand the relationship between the dimension of shim 25 and the skin forming gap G of passage 58, reference is made to FIGS. 8-10 which schematically illustrate the correlation between the dimension of the shim 25 and the sloped skin-forming passage 58 which is obtained through the contours of the mask 24 and the relieved die body 22 when an 18° slope is utilized. Referring first to FIG. 8, when no shim is in place between the skin forming mask 24 and the die body 22, the contours of both are congruent along the horizontal surfaces 42, 48, the smooth radiuses 46, 50 and the 18° sloping surfaces 44, 52. Accordingly, the skin forming mask 24 and the relieved portion of the die 22 fit snugly against each other. In order to show the relationship between sloping walls 44, 52, the intersection between the sloping wall 52 and the straight cylindrical surface 54 is designated as a point E, and when the mask and the die fit snugly against each other, the point E on the mask rests in contact with a point E1 on the sloped surface 44.

Referring now to FIG. 9, when a shim 25 is placed between the skin forming mask 24 and the die 22, the mask is raised a distance equivalent to the shim thickness. Similarly, the point E moves away from the point E1 the same distance, and always in the direction indicated by the arrow A. However, the skin gap G between the sloped surfaces 44, 52, opens up only a fraction of the shim thickness. The actual opening of the gap G is equal to the tangent of 18° multiplied by the shim thickness. Thus, a 0.010" (0.25 mm) shim would open the skin gap G by 0.32492×0.010 (0.083 mm), or approximately ⅓ the shim thickness. Therefore, it can be seen that as the depth or gap D of the collector passageway 56 is opened a given distance by the shim 25, the skin gap G of the sloped skin-forming passage 58 is opened only approximately ⅓ the shim thickness.

Referring now to FIG. 10, when the thickness of shim 25 is further increased, it results in the further distancing of point E from point E1 in a vertical distance D along arrow A, such that the vertical distance between point E and point E1 is always equal to the shim thickness. The reason for this is the fact that the point E always moves away from the point E1 in the direction shown by the arrow A. The skin gap G of sloped skin-forming passage 58 also continues to increase, but always in the relationship of the tangent of 18° × the shim thickness. The enabling condition which permits the shim 25 to function as a skin gap control, is that the surfaces 44, 52, of the 18° sloped skin-forming passage 58 do not move perpendicular to each other as do surfaces 42, 48 of the collector passageway 56, but rather move apart in an approximate 1 to 3 relationship with the thickness of the shim. When, on the contrary, the skin gap sidewalls are vertical or longitudinally parallel with the extrusion flow, as shown in FIG. 9 of U.S. Pat. No. 4,381,912, the skin gap dimension is permanently fixed by the hardware dimensions, and no amount of change in the shim thickness can have any effect on the skin gap.

Referring again back to FIG. 3, although point E has been shown as being relatively angular at the point of intersection of the surfaces 52 and 54, in reality the point is provided with a small radius on the order of between about 0.01" (0.25 mm) and 0.025" (0.64 mm). Further, as noted in FIG. 3, the point E is shown positioned outwardly beyond the outlet face 36 of the die body 22, whereas it may be at the level of the outlet face. Previously, it was always thought that the point E had to be inwardly of the discharge face to insure against collapse of cells in the peripheral areas of the substrate. However, improved benefits may be obtained by positioning point E a slight distance beyond the outlet face of the die. That is, since the substrate in its wet state does possess some small degree of resiliency and elasticity, before permanent deformation can take place, the external forces must be greater than that from which the recovery can take place. Accordingly, point E may be as much as twice the skin thickness beyond the outlet face and no permanent peripheral deformation occurs. Also, by extending point E to or beyond the outlet face 36, it increases the length of the skin-forming passage 58, thereby providing more residence time for skin formation and for knitting to take place between the skin and the webs, and therefore allows more stabilization of the webs and the skin to occur before the substrate actually exits from the forming surface of the die.

From the previous discussion relative to the relationship between the thickness of shim 25, determining the flow gap, depth or thickness D of the annular collector passageway 56, and the skin gap, depth or thickness G of the skin-forming passage 58, it becomes apparent that as the flow of skin-forming material moves radially-inwardly within collector passageway 56 and passes through the transition zone or gap 60 into the skin forming passage 58, a first or primary reduction in the flow depth of the material is obtained in a plane containing the longitudinal axis of the die and perpendicular to the direction of flow. That is, since the skin-forming passage has approximately ⅓ the flow gap as that of the collector passageway, the depth of the flow of the material is decreased as it flows into the passage 58. The first or primary reduction in the flow path of the skin-forming batch material, which is in the form of a reduction in flow depth taken perpendicular to flow, occurs as the flow of skin-forming batch material is turned in the transition zone from a radially-inward flow to a nearly longitudinal flow, where the knitting of such skin-forming batch material with peripheral web portions of the substrate is initiated. This significant reduction in the flow gap increases the resistance to flow and forces the batch material to shear under pressure, which we theorize improves knitting between the skin and peripheral webs for reasons set forth hereinafter. Further, since the skin-forming passage 58 is frusto-conical in shape, such that it converges toward the outlet face 36 of the die 22, it will become apparent that the cross-section of the annulus taken perpendicular to the longitudinal axis of the die decreases as the flow proceeds from the radiused gap 60 to the outlet face 36. Accordingly, a secondary reduction is obtained within the material flowing through the skin-forming passage 58, in the form of a decreased cross-sectional area, due to the decreasing annular diameter of the passage between the radiused gap 60 and the outlet face 36.

Figure 11:
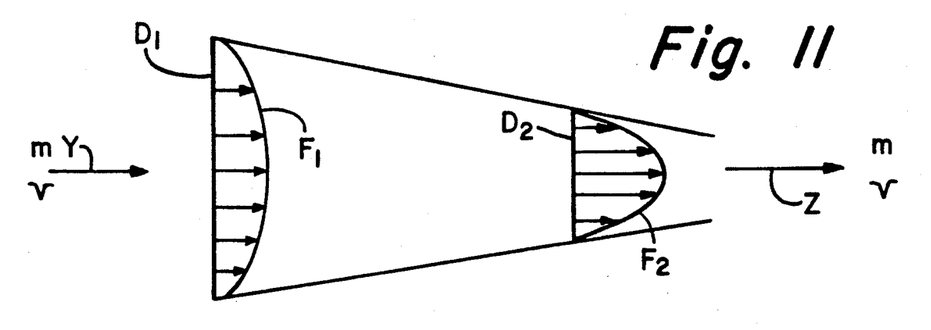
FIG. 11 is a schematic diagram illustrating the shearing effect produced in the batch flow upon reducing the flow depth as set forth in the present invention.

With respect to our theory regarding improved knitting between the skin forming batch material and the peripheral webs, attention is directed to the schematic illustration shown in FIG. 11. A converging flow from left to right is shown by arrows Y and Z, which illustrate the flow having an initial flow depth of $D_1$ to a lesser depth $D_2$. At a steady state, the mass flow rate m (g/sec.) is constant at both arrows Y and Z, and the volumetric flow rate v (cc/sec.) is essentially constant, since the batch is nearly incompressible so that the density remains constant. However, the average linear velocity increases with the decreasing depth, which is taken perpendicular to the flow. The flow front proceeds from that shown at $F_1$ to a more favorable profile shown at $F_2$ for promoting knitting via greater shearing of the batch material. Although the pressure decreases in the direction of flow, as the depth of flow decreases, resistance to flow increases so that greater pressure can be maintained than with a constant or diverging flow gap proceeding from $D_1$. A constant cross-section or flow gap, usually results in plug flow wherein the batch shears only at the wall, whereas the converging flow of the present invention promotes batch shearing across the flow channel shown particularly at flow front $F_2$, which has a tendency to promote knitting of the batch material. That is, it is postulated that if a freshly-sheared batch is delivered into a skin/web cavity, while the batch particles are still relatively mobile due to the shearing effect, the particle matrix will have a tendency to extend uniformly throughout the structure and across the knitting line, providing a junction which is virtually fully as strong as the skin and web which it joins.

The control or metering of flow volume of the skin forming batch material is accomplished by the flow control plate 26 and the spacer 28 mounted adjacent the inlet end 30 of the die body 22, which functions to either block off or expose feed holes and thus control the flow of batch material into the die. The flow control plate exerts a large effect on flow, while the spacer acts as a fine tuner of the flow. The thickness of the spacer 28 actually provides the fine tuning for metering the flow into the peripheral feed passageways 32 which provide material to the slots 35 surrounding partial pins 40. The inner diameter of the spacer is selected so as to be out of the way and not interfere with the flow of extrusion material into a desired feed hole.

Standard flow plates tend to mimic the shape and dimension of the skin-forming mask, but need not have equal internal diameters. Typically, a set of flow plates will be available, such that a smaller internal diameter flow control plate will reduce the amount of flow to the partial pins, while a larger internal diameter flow control plate will increase such flow to the partial pins. The thickness of the spacer 28 establishes the amount of batch that can move under the flow control plate 26 to supply the peripheral feed holes 32 of the die 22 and accordingly the slots 35 about partial pins 40. Although it is convenient to make the shim 25 and the spacer 28 the same diameter and thickness, it is certainly not necessary, as each can be varied for desired results.

In the operation of the preferred embodiment shown in FIGS. 3 and 4, batch material is supplied to the inlet end 30 of the die body 22. A central portion of such material flows longitudinally through central feed holes 32 and into the interconnected discharge slots 34. Due to impedance within the slots, the flow is both longitudinal and transverse so as to provide a coherent gridwork-like mass within the slots surrounding the pin structure of the die body prior to being discharged from the outlet face 36. Simultaneously, batch material flows transversely within a metering channel 62, formed between the flow control plate 26 and the inlet face 30 of the die body by means of spacer 28, so as to meter the flow of skin-forming batch material to the peripheral feed holes 32 which feed skin-forming batch material to the slots 35 surrounding the partial pins 40. The partial pins 40, remaining on the die, retain a predetermined portion of the original impedance of the central full height pins 38. This partial impedance encourages skin flow and also imparts a degree of control over the batch flow into the collector passageway 56.

The collector passageway 56 receives the batch material flowing through the slots 35 adjacent the partial pins 40 and initially directs such flow transversely radially-inwardly toward the center of the die. The transition zone, which may be in the form of radiused gap 60, between the skin forming mask 24 and the die body 22 receives the batch flowing within collector passageway 56 and gently turns it from a transverse radially-inward flow toward a more longitudinal direction. The skin forming process actually begins in the radiused gap 60. Also, since the collector passageway 56 is larger in the depth of flow taken in a plane containing the longitudinal axis X and perpendicular to the direction of flow than the sloped skin-forming passage 58, there is a first or primary flow path reduction in the form of a decreased flow depth or gap at the transition zone or reduction gap 60 as the flow enters passage 58. A second reduction of secondary importance occurs in the sloped skin-forming passage 58, thus facilitating the knitting of the skin and peripheral webs together. As the skin-forming batch material flows through the sloped skin-forming passage 58, it encounters other batch material flowing transversely from the slots 34 in the die 22, and the knitting process is initiated at this point, which begins at the juncture of transition gap 60 and passage 58.

The sloped 18° passage 58 has parallel walls 44, 52, and the second flow path reduction is due to the fact that the annulus of passage 58 decreases in diameter from the transition zone or gap 60 to the outlet face 36, and thus the cross-section of the annulus perpendicular to the longitudinal axis X is decreased. The flow obtained in the sloped passage, which is maintained under pressure, forces a knitting of the webs with the skin, prior to exiting from the die. That is, the webs are well joined with the skin while within the die proper.

Further, in view of the fact that the major component of flow of the material in the skin-forming passage 58 is longitudinally parallel with the longitudinal axis flow of the web-forming batch material through the slots 34 surrounding the central pins 38, the resulting cellular substrate having an integral skin is virtually distortion free. That is, the small transverse component of the flow of batch material through the sloped skin-forming passage 58 is sufficient to provide excellent knitting of the skin and the peripheral web portions, but is insufficient to produce detrimental distortion of the webs forming the peripheral cells. The shim 25 providing skin thickness adjustment, and the flow control plate 26 providing flow control adjustment, are designed to provide separate and independent means of establishing and controlling each of these two very important aspects of the skin forming operation.

Figure 5:
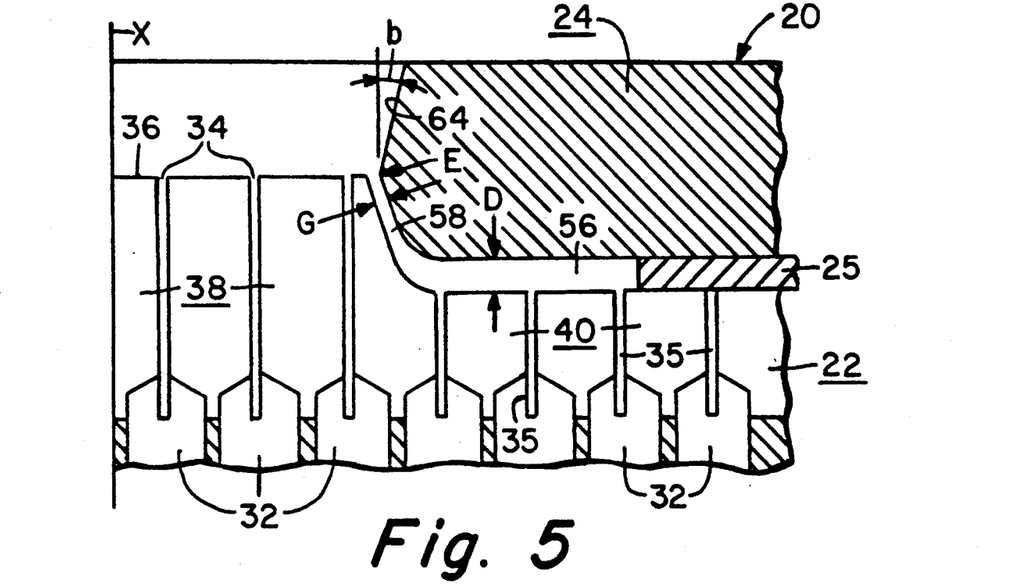
FIG. 5 is a fragmental cross-sectional view in elevation of a further embodiment of an extrusion die assembly of the present invention.

Referring now to FIG. 5, a further embodiment of the invention is disclosed which is similar to the preferred embodiment of FIGS. 3 and 4, with the exception that the straight cylindrical surface 54 of the embodiment of FIG. 3 is relieved to form a tapered frusto-conical surface 64, which tapers outwardly away from outlet face 36. Traditionally, the straight portion of the mask beyond point E usually extends parallel to the direction of extrusion, and thus is perpendicular to the die face. Thus, during such prior art extrusion, when the main central portion of the substrate exits the die, it is immediately free of any further contact with any part of the die. However, when the skin surface exits the die, it remains in contact with such straight inner contour of the mask, creating a frictional drag on the skin which acts in opposition to the freely moving interior portions. This frictional drag sets up a shear condition in the peripheral cells, which must be overcome by the structural integrity of the substrate. Further, there exists a scraping or troweling action against the skin surface, which does not contribute to good skin formation, but which in fact can prove bothersome.

For purposes of clarity in the illustration, the relief angle b above point E, taken relative to the longitudinal flow axis X of the batch material, is shown in an exaggerated form. In actuality, this angle can be very small, since it does not take much relief to remove the mask from contact with the skin. And once the mask is no longer riding on the skin, the angle can have no influence on the extrusion operation, and thus could be of any value up to possibly 90°. However, a preferred range of angle b is from a fraction of a degree up to about 5°. In view of the fact that the tapered surface 64 of mask 24 above point E is provided with a relief angle b, the mask may be so positioned on the die 22 so that point E is at, above, or below the outlet face 36 of the die body 22. In operation, the embodiment shown in FIG. 5 functions the same as that shown in FIG. 3, with the exception that as the skin material flowing along skin-forming passage 58 reaches point E, the relief angle b functions to remove the mask from contact with the skin, thereby removing any shear condition which otherwise could be created by a frictional drag on the skin by the mask.

Figure 6:
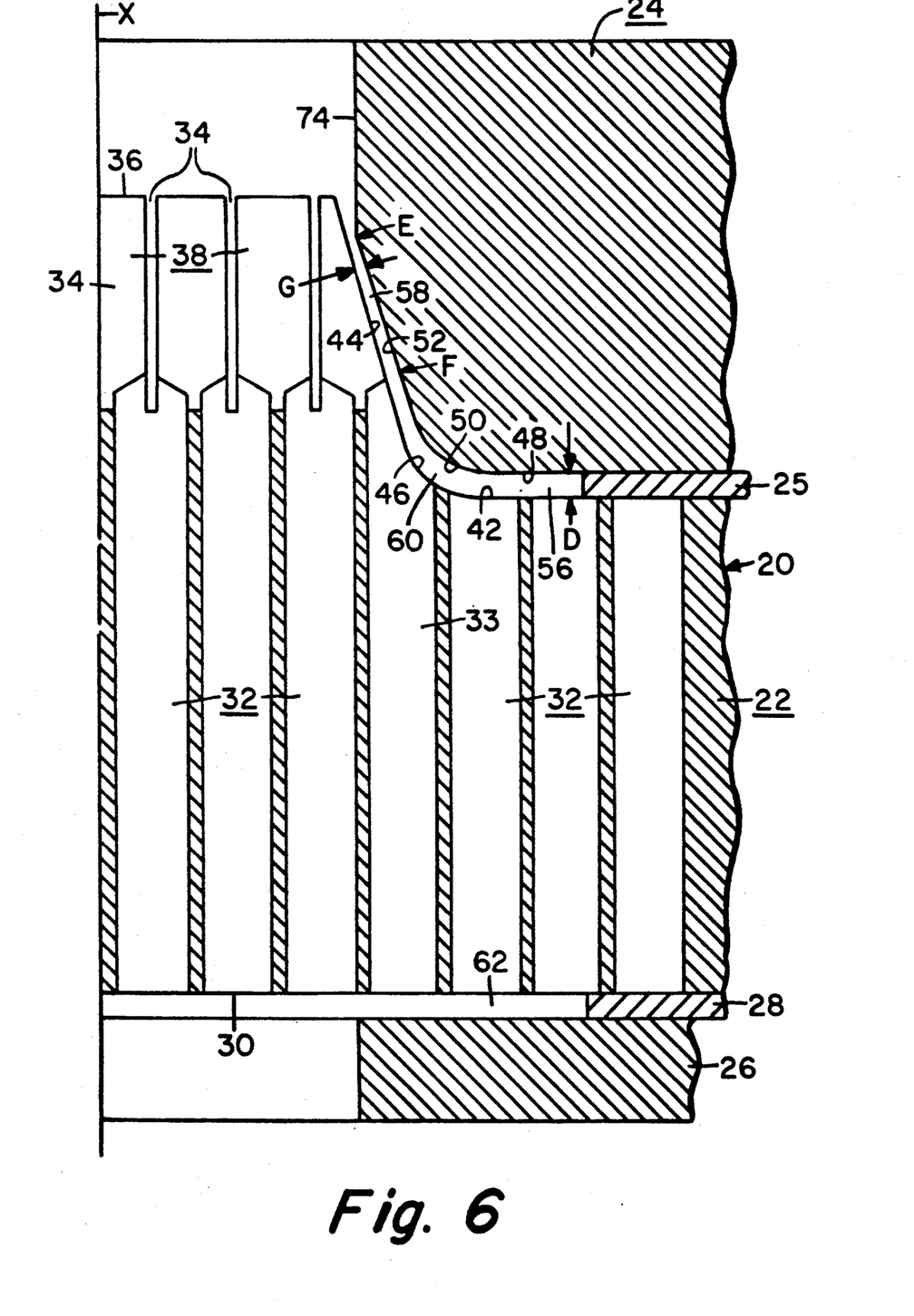
FIG. 6 is a fragmental cross-sectional view in elevation of a still further embodiment of an extrusion die assembly of the present invention.

Referring now to FIG. 6, a further embodiment of the invention is shown, which is again similar to the preferred embodiment of FIG. 3, with the exception that the peripheral portion of outlet face 36 is materially relieved so that there are no peripheral partial pins and the collector passageway 56 communicates directly with the peripheral feedholes 32. The inner peripheral surface 74 of the mask 24 above point E may be either a straight cylindrical surface like surface 54 of FIG. 3 or a tapered frusto-conical surface like 64 of FIG. 5. In addition, point E may be positioned at, below, or above the central outlet face 36.

The operation of the embodiment shown in FIG. 6 is similar in many respects to that shown in FIG. 3, but with some exceptions. The batch material enters the die 22 at the inlet end 30 and flows through the feed holes 32. Whereas the central portion of the batch material flows longitudinally through feed holes 32 and into the interconnected slots 34, peripheral portions of the batch material flow transversely in metering channel 62 formed by the flow control plate 26 and spacer 28, and then flows longitudinally through the peripheral feed holes 32 directly into the collector passageway 56. The contouring of the die 22 by relieving the peripheral portion thereof below the pins 38, appreciably shortens the peripheral feed holes and results in less total impedance than that within the central feed holes 32 feeding slots 34. Potential flow volume is thus improved and enhances the ability of the flow control devices 26, 28 to precisely meter batch material into the peripheral area.

From the peripheral feed holes 32, the skin-forming batch material flows directly into the collector passageway 56, and then radially-inwardly through the transition zone, shown as radiused gap 60, which provides a smooth rounded arc transition into the sloped skin-forming passage 58. The major component of flow within passage 58 is largely in the direction of the longitudinal extrusion, with the skin-forming batch material velocity approximating that of the batch material forming the webs of the cellular substrate within slots 34 between pins 38. Flow through feed holes 33, which intersect with the radiused gap 60 and the sloped skin-forming passage 58, is blocked off or greatly reduced to eliminate any interference with a smooth flow of the skin material in such areas. Although not shown, flow control into the feed holes 33 can be derived from any of several known methods, such as a traditional backer plate, a custom drilled flow control plate, or selective feed hole diameters.

As the skin-forming material enters the radiused gap 60 and moves into the sloped skin-forming passage 58, a first flow path reduction takes place, the form of a decreased flow depth or gap taken in a direction perpendicular to the direction of flow, due to the decrease in the flow gap of the skin-forming passage 58 over that of the collector passageway 56. Thus, as the material moves from the radius gap 60 to a point F at the base of the pins 38, the skin moves almost as a sheet of batch material completely independent of the webs being formed by slots 34. However, when the skin material reaches point F, it encounters batch being extruded through the slots 34. At this depth in the die there is still an appreciable amount of internal pressure which is definitely enough to cause good knitting where the webs and the skin encounter each other. Since the skin and the webs are both still completely contained between the parallel plate-like walls of mask 24 and die 22, which form passage 58, knitting can take place in a completely contained environment with neither distortion nor web swelling.

The knitting of the newly formed skin and the webs takes place between point F and point E along the skin-forming passage 58. The skin thickness gap G is determined by the thickness of the shim 25 in the manner described with regard to FIG. 3. Also, since the skin flows radially-inwardly along the frusto-conical skin-forming passage 58, the second flow path reduction in the form of a reduced cross-sectional flow area takes place in view of the fact that the skin-forming passage is becoming gradually smaller in annular cross-section perpendicular to the longitudinal axis X, due to the reduced annulus diameter of the frusto-conical passageway. However, in view of the fact that the major component of flow along passage 58 is longitudinally parallel with the flow of extrusion through the die, the knitting of the peripheral webs and the skin material is accomplished without any detrimental distortion of the peripheral cells.

At point E, the contour of the skin-forming ring 24 departs from following the contour of the die, and may abruptly parallel the direction of extrusion. Pressure forces which still exist in the die continue to extrude the webs laterally, which force the skin against the straight sided portion of the skin forming ring. Therefore, instead of the skin batch moving radially inward to impact upon freshly extruded substrate and crush or distort peripheral webs and cells, in the present embodiment the peripheral webs move outwardly to force the skin against the solid metal inner peripheral surface 74 of the skin forming ring 24. However, if desired, the inner peripheral surface 74 of the mask 24 may be relieved such as surface 64 of the embodiment shown in FIG. 5.

Figure 7:
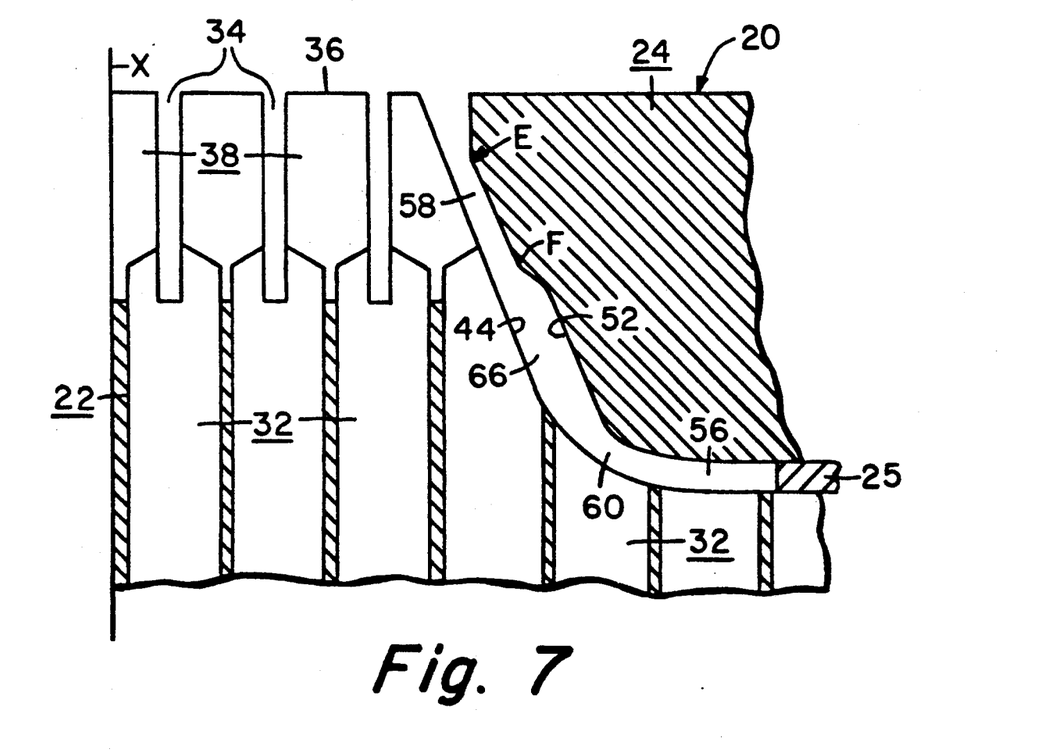
FIG. 7 is a fragmental cross-sectional view in elevation of another embodiment of an extrusion die assembly of the present invention.

Referring now to FIG. 7, a further embodiment is shown which is similar in many respects to the embodiment shown in FIG. 6, in that the collector passageway 56 communicates directly with the peripheral feed holes 32. However, a feed reservoir 66 of expanded cross section is formed between the collector passageway 56 and the skin-forming passage 58. The feed reservoir 66 may be formed by relieving an inner sloped surface portion 52 of the mask 24 as shown, or by relieving a sloped surface 44 of the die 22. As the skin forming batch material flows from the collector passageway 56 radially inwardly, it is smoothly transitioned by the radiused gap zone 60 into a feed reservoir 66 of substantially larger cross section. In effect the reservoir 66 is an inward extension of the passage 58 since it is shown with the same sloped angle. However, at point F, the reservoir 66 terminates in a smooth arc which connects with the skin-forming passage 58 of a smaller flow depth or gap as taken perpendicular to the direction of material flow. Such transition produces a reduction of the flow gap immediately before such flow encounters the web material from slots 34. Such contracting mode provides pressure in opposition to the intersecting web pressure to work cooperatively therewith and insure a good knitting and uniform slot fill in all parts of the die.

In view of the decreasing diameter of the frusto-conical skin-forming passage 58, the skin-forming material is provided with a further flow path reduction due to a reduced cross-sectional area between points F and point E. This in turn facilitates the knitting of the skin with the webs of the substrate within the die, and also between points F and E. The opposing sides which form the knitting zone can either be parallel or angled with respect to each other. The parallel design has a double reduction in its flow path, in that there is a decrease in the flow gap or depth between the reservoir and the knitting zone, and due to the shrinking perimeter of the annular gap as it nears the outlet face of the die, the cross-sectional area of the flow annulus decreases. A converging tapered zone adds a further continuing decrease in the flow gap. At point E, the extruded cellular substrate follows the direction as described with respect to the embodiment of FIG. 6.

Figure 12:
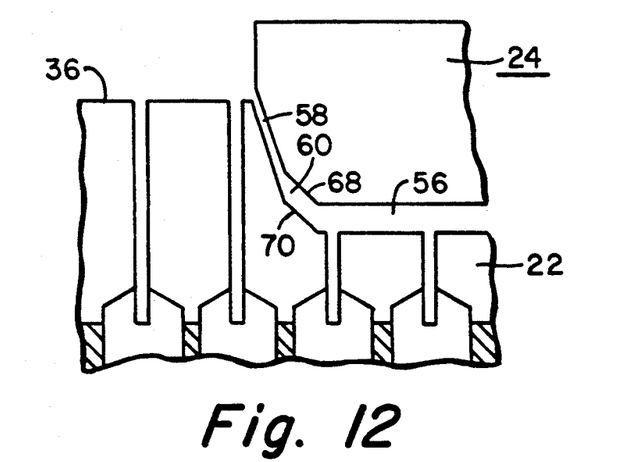
FIG. 12 is a fragmental schematic view illustrating a further embodiment of the transition zone forming a part of the present invention.

Referring now to FIG. 12, a further embodiment of the transition zone 60 is shown wherein a pair of parallel stepped or inclined angular surfaces 68, 70 transition the flow path from the collector passageway 56 to the sloped skin-forming passage 58. Although only one pair of such parallel inclined surfaces is shown, a plurality of such surfaces, with increasing angular content, may be utilized if desired to more smoothly transition the flow.

Figure 13:
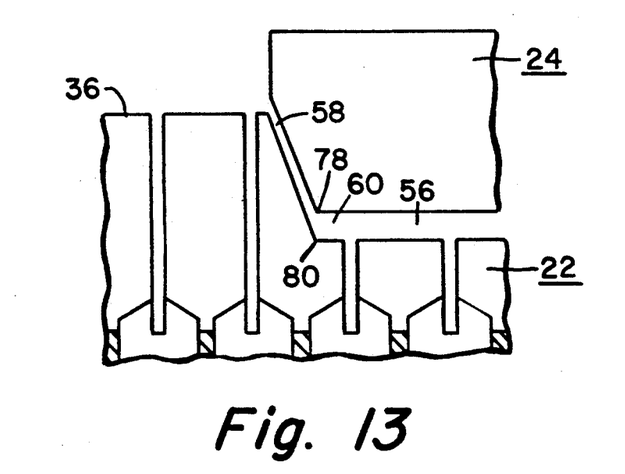
FIG. 13 is a fragmental schematic illustration of a still further embodiment of the transition zone.

Referring now to FIG. 13, the transition zone 60 is merely shown as a pair of intersecting corners 78,80 between the collector passageway 56 and the sloped skin-forming passage 58. The corners 78,80 could be provided with a slight radius, either in their manufacture, or by the abrasion of the flowing batch material.

Figure 14:
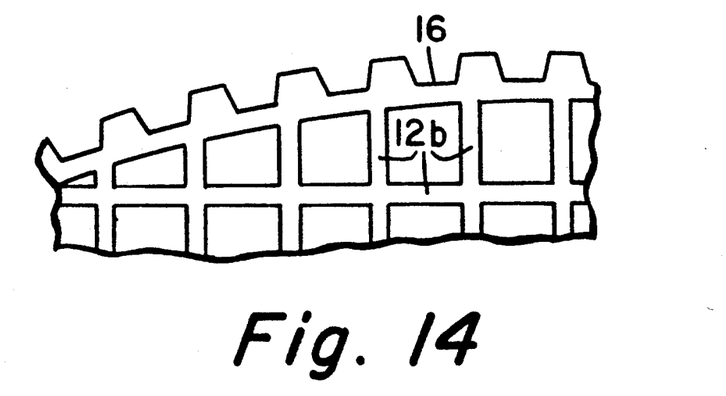
FIGS. 14, 15 and 16 are fragmental schematic illustrations of various forms of the uniformly contoured or smooth outer peripheral skins which may be formed integrally with the honeycomb structure.
Figure 15:
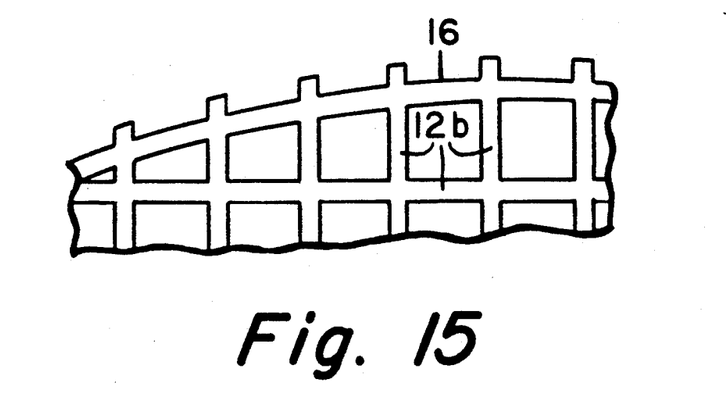
Figure 16:
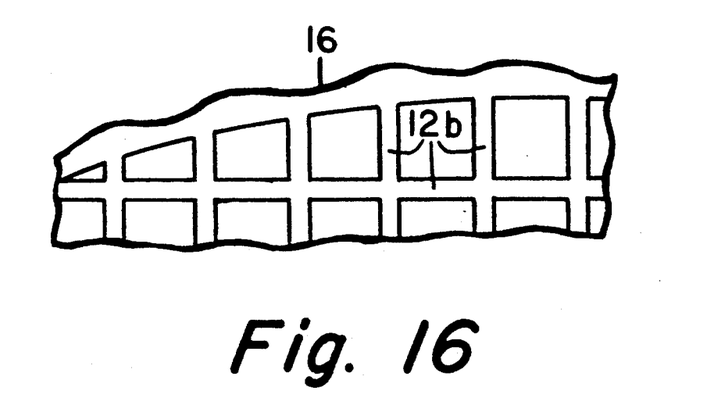

Referring now to FIGS. 14 through 16 inclusive, various forms of uniformly contoured peripheral skins are disclosed which may be applied to the cellular structure of the present invention. Although the invention has been disclosed relative to smooth or contoured integral outer peripheral skins, it is a relatively straightforward matter to create ribs or other strengthening geometries in the skin surface in a direction parallel to the longitudinal extrusion. As shown in FIG. 14 the skin may be provided with a plurality of uniformly spaced ribs having a trapezoidal cross-section, in FIG. 15 the ribs may be more or less an extension of the cross-sectional webs, whereas in FIG. 16 the skin may be provided with smoothly curved undulations about its periphery. The location of the external skin protrusions or ribs can be oriented with the web placement or centrally thereof as desired. Such designs would be machined into the skin-forming mask 24 to create the desired effect. During extrusion, the batch flow in the skin area would be adjusted to accomodate the combined volume needs of both the normal skin and the added protrusions.

The method and die of the invention are particularly beneficial in extruding monolithic honeycomb or cellular substrates or structures with very thin webs less than about 6 mils (0.15 mm) and particularly those with transverse cross section cell density so as to provide transverse cross section open frontal area (i.e. aggregate of transverse cross section open cell area) greater than 75%. However, such invention can also be usefully used with substrates or structures with more conventional web thicknesses and open frontal areas. Examples of honeycomb or cellular structures with cells of square transverse cross-sectional shape are (see symbol definitions below):

| OFA | CD-e | CD-m | WC-e | WC-m | WT-e | WT-m |
| --- | --- | --- | --- | --- | --- | --- |
| 80 | 350 | 54.3 | 0.0535 | 1.36 | 0.0057 | 0.145 |
| 80 | 440 | 68.2 | 0.0477 | 1.21 | 0.0050 | 0.127 |
| 80 | 470 | 72.9 | 0.0461 | 1.17 | 0.0048 | 0.122 |
| 70 | 16 | 2.5 | 0.2500 | 6.35 | 0.0408 | 1.036 |
| 70 | 25 | 3.9 | 0.2000 | 5.08 | 0.0327 | 0.831 |
| 70 | 100 | 15.5 | 0.1000 | 2.54 | 0.0163 | 0.414 |
| 70 | 200 | 31.0 | 0.0707 | 1.80 | 0.0115 | 0.292 |
| 70 | 300 | 46.5 | 0.0577 | 1.47 | 0.0094 | 0.239 |
| 70 | 400 | 62.0 | 0.0500 | 1.27 | 0.0082 | 0.208 |
| 60 | 150 | 23.3 | 0.0816 | 2.07 | 0.0184 | 0.467 |
| 60 | 200 | 31.0 | 0.0707 | 1.80 | 0.0159 | 0.404 |

OFA: transverse open frontal area - %
CD-e: transverse cell density - cells/inch$^2$
CD-m: transverse cell density - cells/cm$^2$
WC-e: transverse distance between adjacent wall centerlines - inch
WC-m: transverse distance between adjacent wall centerlines - mm
WT-e: wall thickness - inch
WT-m: wall thickness - mm Although the now preferred embodiments of the invention have been disclosed, it will be apparent to those skilled in the art that various changes and modifications may be made thereto without departing from the spirit and scope of the invention as set forth in the appended claims.

What is claimed is:

1. A method of forming a cellular structure having an integral skin thereon from batch material which comprises:

extruding a central cellular structure from batch material along a longitudinal axis through a die assembly having an outlet face;

collecting a portion of batch material within the die assembly peripherally of said central cellular structure;

flowing the collected portion of said peripheral batch material from a passageway of one depth of flow, as taken in a plane containing said longitudinal axis and perpendicular to the direction of flow of said collected portion of peripheral batch material, into a passage of a lesser flow depth;

flowing the collected batch material through aid passage, said passage being of progressively reduced cross-sectional area, said cross-sectional area taken in parallel planes perpendicular to said longitudinal axis, as said material flows therethrough;

simultaneously with said flowing the collected batch material through said passage, and while still within said die assembly, knitting said flow of collected batch material with peripheral web portions of aid central cellular structure to form an integral skin of batch material thereon whereby said passage is oriented so that a major component of flow of said batch material therethrough is parallel to said longitudinal axis and thereby minimizes transverse forces exerted on said peripheral web portions; and simultaneously discharging said central cellular structure and said skin from said die assembly as a unitary structure.

2. A method of forming a cellular structure as defined in claim 1 including the steps of flowing said collected batch material from said passageway through a smoothly curved radiused arc transition zone into said passage and transitioning said batch flow from a predominantly transverse flow to a predominantly longitudinal flow parallel to said longitudinal axis.

3. A method of forming a cellular structure as defined in claim 1 including the step of metering the flow of batch material within the die assembly which is collected peripherally of said central cellular structure.

4. A method of forming a cellular structure as defined in claim 1 including the step of flowing said portion of batch material longitudinally through peripheral feed holes in said die assembly, and collecting such batch material within a collector passageway extending perpendicular to longitudinal axis.

5. A method of forming a cellular structure as defined in claim 4 including the step of flowing said portion of batch material directly from said peripheral feed holes into said collector passageway.

6. A method of forming a cellular structure as defined in claim 4 including the step of flowing said portion of batch material from said peripheral feed holes through a plurality of interconnected discharge slots surrounding a plurality of peripheral partial pins and collecting such flow from said slots within said collector passageway.

7. A method of forming a cellular structure as defined in claim 1 including the step of flowing said collected batch material through a frusto-conical passage converging toward an outlet face of said die assembly.

8. A method of forming a cellular structure as defined in claim 1 including the step of knitting said collected batch material with peripheral web portions of said central cellular structure as such batch material flows through said passage from a point where said passage first intersects a plurality of interconnected discharge slots forming said webs to a point where parallel plate-like sidewalls of said passage diverge.

9. A method of forming a cellular structure as defined in claim 1 including the step of flowing the collected portion of said peripheral batch material into an expanded feed reservoir prior to reducing the flow depth of such flow of batch material.

10. A method of forming a cellular structure as defined in claim 1 including the step of flowing the collected material through passage at an angle of about 18° from said longitudinal axis.

11. A method of forming a cellular structure as defined in claim 1 including the steps of controlling the depth of flow of said collected batch material with a formulated correlation by controlling the depth of the passageway.

12. A method of forming a cellular structure as defined in claim 1 including the step of providing relief for said skin immediately adjacent said discharge from said die assembly to prevent a frictional drag on the skin surface.

13. A method of extruding a honeycomb structure from batch material with a skin formed thereon, wherein the honeycomb structure has a plurality of longitudinally extending cells formed by a plurality of interconnected webs, and said skin is formed on said honeycomb structure from said batch material simultaneously with the extrusion of the honeycomb structure without detrimental distortion of peripheral cells thereof which comprises:

flowing batch material longitudinally through an extrusion die assembly for extruding a central honeycomb structure;

metering a portion of said batch material for forming a skin about said honeycomb structure;

initially collecting the skin-forming batch material within a flow path of one flow depth formed in said extrusion die assembly;

directing such flow of initially collected skin-forming batch material peripherally of the extruding central honeycomb structure, through a transition zone and into a flow path of reduced flow depth relative to said one flow depth such that a major component of such flow parallels the longitudinal flow of the batch material for forming the central honeycomb structure, and thereby minimizing transverse forces exerted on peripheral portions of the central honeycomb structure;

further reducing the cross-sectional area of the flow of said skin-forming batch material along the directed flow and, while within said extrusion die assembly, knitting such flow with peripheral web portions of said extruding central honeycomb structure, without detrimentally distorting such web portions; and discharging said honeycomb structure with said skin formed thereon from said extrusion die assembly as a unitary structure virtually free of distortion.

14. A method of extruding a honeycomb structure as defined in claim 13 including the steps of flowing a portion of said batch material through a metering channel adjacent an inlet face of said extrusion die assembly, and adjusting the depth of said channel to provide the desired flow of skin-forming batch material.

15. A method of extruding a honeycomb structure as defined in claim 13 including the step of flowing said skin-forming batch material from a passageway of one flow depth taken in a plane containing a longitudinal axis of said die assembly and perpendicular to the direction of material flow, into a passage of a lesser flow depth taken in said same plane.

16. A method of extruding a honeycomb structure as defined in claim 13 including the step of passing the flow of said skin forming batch material through a smoothly curved radiused transition zone arc to smoothly transition such flow, prior to knitting with said peripheral web portions, from a predominantly transverse flow to a predominantly longitudinal flow paralleling said longitudinal flow of the batch material forming the central honeycomb structure.

17. A method of extruding a honeycomb structure as defined in claim 13 including the step of providing sufficient pressure to said skin-forming batch material so that transverse forces exerted by the peripheral web portions on the skin forming material are met with opposing forces to enhance the knitting of the skin-forming batch material with the peripheral web portions and form a unitary structure of improved strength.

18. A method of extruding a honeycomb structure as defined in claim 13 including the steps of discharging said honeycomb structure from an outlet face of the extrusion die assembly and providing relief between an outer portion of newly formed skin and adjacent wall portions of said extrusion die assembly, and thereby facilitating a substantially friction free movement of the skin past such wall portions.

19. A method of extruding a honeycomb structure as defined in claim 13 including the step of directing such flow of initially collected skin-forming batch material at an angle of about 18° with respect to the longitudinal flow of the batch material forming the central honeycomb structure.

* * * * *